(12) United States Patent
Mohamed (10) Patent No.: US 10,048,441 B1
(45) Date of Patent: Aug. 14, 2018

(54) VARIABLE OPTICAL SPLITTER SYSTEM

(71) Applicant: KING SAUD UNIVERSITY, Riyadh (SA)

(72) Inventor: Ehab Salaheldin Awad Mohamed, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/822,075

(22) Filed: Nov. 24, 2017

(51) Int. Cl.
*G02B 6/12* (2006.01)
*G02B 6/125* (2006.01)

(52) U.S. Cl.
CPC ...... *G02B 6/125* (2013.01); *G02B 2006/1215* (2013.01); *G02B 2006/12095* (2013.01)

(58) Field of Classification Search
CPC ............ G02B 6/125; G02B 2006/1215; G02B 2006/12095
See application file for complete search history.

(56) References Cited

U.S. PATENT DOCUMENTS

| | | | |
|---|---|---|---|
| 4,135,779 A | 1/1979 | Hudson | |
| 5,745,619 A * | 4/1998 | Li | G02B 6/125 385/42 |
| 6,222,966 B1 * | 4/2001 | Khan | G02F 1/3137 385/4 |
| 6,236,785 B1 | 5/2001 | Parker et al. | |
| 2003/0016914 A1 * | 1/2003 | Kim | G02B 6/1228 385/45 |
| 2003/0133663 A1 * | 7/2003 | Orignac | G02B 6/125 385/45 |
| 2003/0156795 A1 * | 8/2003 | Kim | G02B 6/125 385/45 |
| 2003/0174961 A1 * | 9/2003 | Hamada | B82Y 20/00 385/48 |
| 2005/0069258 A1 * | 3/2005 | Zheng | G02B 6/125 385/45 |
| 2005/0207705 A1 * | 9/2005 | Laurent-Lund | G02B 6/125 385/45 |
| 2007/0036486 A1 * | 2/2007 | Miyadera | G02B 6/2813 385/45 |
| 2007/0086704 A1 * | 4/2007 | Ishikawa | G02B 6/125 385/43 |
| 2016/0301495 A1 | 10/2016 | Ji et al. | |

* cited by examiner

*Primary Examiner* — Ellen Kim
(74) *Attorney, Agent, or Firm* — Richard C. Litman (57) ABSTRACT

The variable optical splitter system includes a V-shaped optical splitter for use in planar lightwave circuits (PLCs), photonic integrated circuits (PICs), etc. The V-shaped optical splitter has first and second optically transmissive branches sharing a common optically transmissive base, where the first and second optically transmissive branches each define an optical waveguide. The first and second optically transmissive branches are symmetrically angled about a central longitudinal axis. A light source directs a light beam to a laterally extending input surface of the optically transmissive base. The light beam travels parallel to the central longitudinal axis. The optical power splitting ratio is directly proportional to the input beam's displacement from the central longitudinal axis, permitting selective tuning of the ratio during design of the splitter.

4 Claims, 7 Drawing Sheets

VARIABLE OPTICAL SPLITTER SYSTEM

BACKGROUND

1. Field

The disclosure of the present patent application relates generally to optical power-splitting devices, and particularly to a variable optical splitter coupled with a light source for selectively tuning the ratio of optical power division between branches of the optical splitter.

2. Description of the Related Art

Optical splitters (also referred to as fiber optic splitters and beam splitters) are used in optical systems and optical networks to divide an optical beam into multiple beams. In planar lightwave circuits (PLCs) and photonic integrated circuits (PICs), the waveguides forming the splitter are typically fabricated using lithography onto a silica glass substrate, which allows for routing of multiple, divided light beams. Splitters divide input beam power into two or more different output beams, each going in a different direction. This allows for simultaneous distribution of data in optical chips to different optical components.

Silica glass substrate is commonly used for PLC and PIC optical splitters because it has a relatively low optical loss and relatively small nonlinearities over the optical communication wavelength range covering the S, C, L, and U-bands. Additionally, silica glass is compatible with silica-based PLCs and PICs, as well as standard optical fibers. Such splitters are of great interest, since wideband wavelength splitters (operating in the S, C, L and U-bands) are attractive for wavelength division multiplexing interconnections on-chip, and also for manipulations of ultrashort optical pulses. Further, compact-size optical splitters are crucial for PICs and PLCs, where splitting may take place within very small areas to connect different optical components.

Although there are a wide variety of optical splitters (such as bulk optical beam splitters with pigtailed optical fibers, fused biconical taper splitters, silica-glass PLC splitters using a Y-junction, and multimode interference waveguides), silica-glass PLC splitters are of particular importance due their low propagation loss, physical and chemical stability, reliability, ease of fabrication, and relatively low cost. Silica-glass PLC splitters are already in use in directional-couplers, arrayed waveguide gratings, Mach-Zehnder interferometers, variable optical attenuators, reconfigurable optical add-drop multiplexers, optical orthogonal frequency division multiplexers, coherent receivers, and highly functional modulators.

A typical V-shaped or Y-shaped splitter (i.e., a splitter with a single input and two output branches) evenly divides optical power between each branch. Although various types of attenuators and/or amplifiers can be used in combination with the splitter, selectively tuning the ratio of light division between branches is relatively difficult, and each added optical component decreases the overall efficiency of the system. Thus, a variable optical splitter system solving the aforementioned problems is desired.

SUMMARY

The variable optical splitter system includes a V-shaped optical splitter for use in planar lightwave circuits (PLCs), photonic integrated circuits (PICs) or the like, where the ratio of optical power division between the two branches of the V-shaped optical splitter can be selectively tuned. The V-shaped optical splitter has first and second optically transmissive branches sharing a common optically transmissive base, where the first and second optically transmissive branches each define an optical waveguide. The first and second optically transmissive branches are symmetrical about a central longitudinal axis, and respective inner sides of the first and second optically transmissive branches are each angled with respect to the central longitudinal axis and intersect at a vertex positioned along the central longitudinal axis. The optically transmissive base has a laterally extending input surface which is longitudinally opposed from the vertex. Each of the first and second optically transmissive branches has a laterally extending output surface which is parallel to, and longitudinally opposed with respect to, the laterally extending input surface of the base. Each of the first and second optically transmissive branches may have a parabolic, graded refractive index with a maximum refractive index being located along a central axis of the respective one of the first and second optically transmissive branches.

A light source is provided for directing a light beam to the laterally extending input surface of the optically transmissive base. The light beam travels parallel to the central longitudinal axis and orthogonal to the laterally extending input surface. The light source is laterally translatable with respect to the central longitudinal axis such that a splitting ratio of optical power split between the first and second optically transmissive branches is selectively tunable. In use, the light beam is split within a graded index vertex area of the optically transmissive base. The light beam is split by an overlap between respective numerical apertures of the first and second optically transmissive branches. The parabolic, graded-index planar waveguide defining each of the first and second optically transmissive branches ensure confined beam propagation therein, providing for direct mode matching to respective output single-mode optical fibers or cores.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
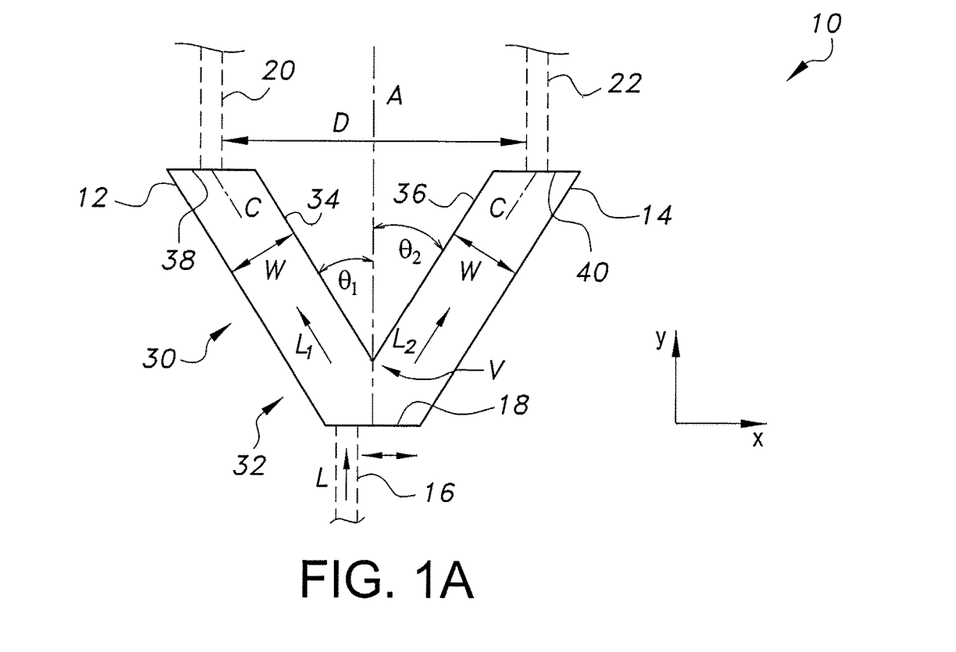
FIG. 1A is a schematic diagram of a variable optical splitter system with the input light beam (or input core) shifted to the left of the central axis of the V-shaped output waveguides.
Figure 1B:
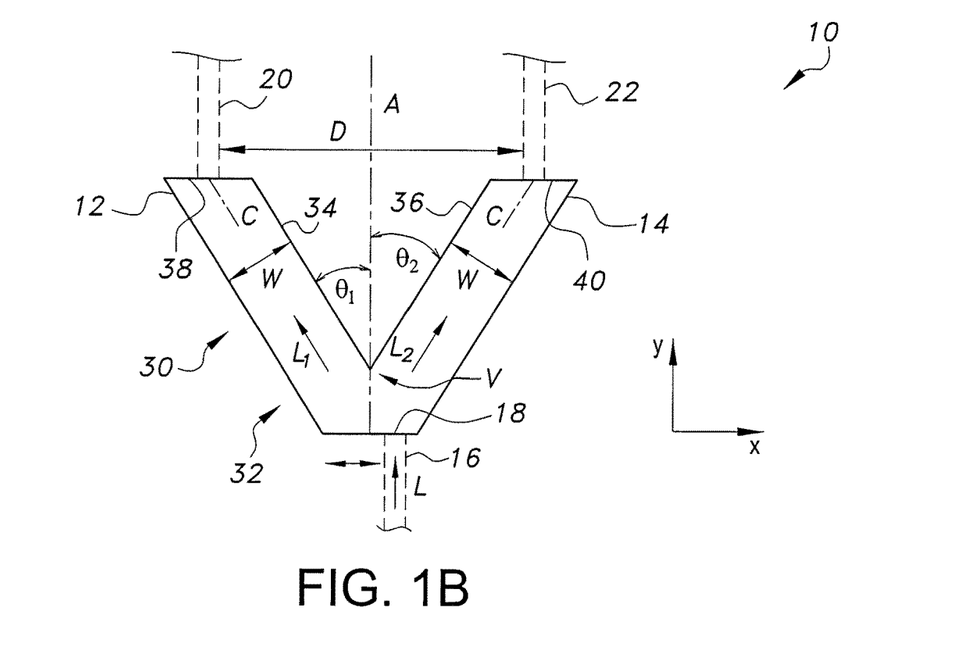
FIG. 1B is a schematic diagram of a variable optical splitter system with the input light beam (or input core) shifted to the right of the central axis of the V-shaped output waveguides.

The variable optical splitter system 10 includes a V-shaped optical splitter 30 for use in planar lightwave circuits (PLCs), photonic integrated circuits (PICs) or the like, where the ratio of optical power division between the two branches of the V-shaped optical splitter 30 can be selectively tuned at the design stage. As shown in FIGS. 1A and 1B, the V-shaped optical splitter 30 is formed as two angle-tilted waveguides, or branches, each at 15° with respect to the input core central-axis A, e.g., in FIGS. 1A and 1B, $\theta_1=\theta_2=15°$, where axis A evenly bisects the junction between branches 12, 14 and is parallel to the direction of input core or input light beam L. In FIGS. 1A and 1B, the light beam L is shown as being input through optical fiber 16, although it should be understood that optical fiber 16 is shown for exemplary purposes only, and that input light beam L may be directed towards input face 18 through any suitable type of optical transmission or coupling.

The waveguides form optically transmissive branches 12, 14, preferably each having a rectangular cross-section. An exemplary thickness (in the direction perpendicular to the page in the orientations of FIGS. 1A and 1B) is 9 with a corresponding exemplary width W of 35 μm. For these exemplary dimensions, the distance D between exemplary output cores or optical fibers 20, 22 (coupled to the outputs of branches 12, 14, respectively) is approximately 140 μm, which is selected to minimize coupling loss. For these exemplary dimensions, a single-mode input optical fiber 16 and single-mode output optical fibers 20, 22 are selected, each with a refractive index, $n_c$, of approximately 1.4551, and each with an exemplary circular cross-section with a radius of 4.5 μm. It should be understood that the relative dimensions of optical fibers 16, 20 and 22 are shown in FIGS. 1A and 1B for exemplary purposes only, and that input optical fiber 16, in particular, is shown for purposes of illustration and clarity, specifically to easily illustrate the variable lateral position of input optical fiber 16 with respect to lateral input face 18, as will be described in greater detail below.

As shown in FIGS. 1A and 1B, the first and second optically transmissive branches 12, 14 of the V-shaped optical splitter 30 share a common optically transmissive base 32. It is important to note that the first and second optically transmissive branches 12, 14, although sharing base 32, each define a separate and distinct optical waveguide. The first and second optically transmissive branches 12, 14 are symmetrically disposed about the central longitudinal axis A (extending along the y-axis in FIGS. 1A and 1B), and the respective inner sides 34, 36 of the first and second optically transmissive branches 12, 14 are each angled with respect to central longitudinal axis A and intersect at a vertex V, which is positioned along the central longitudinal axis A. As noted above, each of the inner sides 34, 36 makes a respective angle $\theta_1$, $\theta_2$ with central longitudinal axis A, and $\theta_1=\theta_2$. (It will be understood that FIGS. 1A and 1B are two-dimensional representations of a three-dimensional body, so that central longitudinal axis A represents a plane extending through the junction of waveguides 12, 14, and sides 34, 36 lies in planes closest to the axis A along the outer circumference of waveguides 12, 14, and angles $\theta_1$, $\theta_2$ are dihedral angles; however, they shall be referred to herein as axis A, vertex V, and planar angles $\theta_1$, $\theta_2$ herein for simplicity in analysis.)

The optically transmissive base 32 has a laterally extending input surface 18 (extending along the x-axis in FIGS. 1A and 1B), which is longitudinally opposed from vertex V. Each of the first and second optically transmissive branches 12, 14 has a laterally extending output surface 38, 40, respectively, which is parallel to, and longitudinally opposed with respect to, the laterally extending input surface 18 of the base 32.

A light source is provided for directing light beam L to the laterally extending input surface 18 of the optically transmissive base 32. As noted above, the light beam L may be transmitted through input optical fiber 16 and may be generated by any suitable light source, such as a laser. The exemplary laser may be coupled to the input optical fiber 16, may direct light beam L directly towards input surface 18, or may transmit light beam L through any other suitable type of optical transmission. The light beam L travels parallel to the central longitudinal axis A and orthogonal to the laterally extending input surface 18. The splitting ratio of optical power split between the first and second optically transmissive branches 12, 14 (waveguides) depends on the relative position of the input core L and the extent to which the input core L overlaps the respective openings to the two output waveguides 12, 14, i.e., the extent to which the input light beam L is translate along the x-axis with respect to the central axis A through the vertex V. This lateral displacement, and hence the power splitting ratio between the two output waveguides 12, 14, may simply be selected during the design process according to the particular application for the optical power splitter 10. To that extent, the power splitting ratio between the two output cores 20, 22 is selectively tunable. The V-shaped optical splitter 30 receives light beam L through the laterally extending input surface 18, which is split into two beams $L_1$, $L_2$, respectively being transmitted through first and second branches 12, 14. Beam $L_1$ is output through output surface 38, where it may pass into output optical fiber 20, and beam $L_2$ is output through output surface 40, where it may pass into output optical fiber 22.

The two branches 12, 14 are each parabolic graded-index planar silica-glass waveguides. As is well known in the field of waveguides and optical fibers, each of first and second branches 12, 14, input optical fiber 16, and output optical fibers 20, 22 are preferably covered by cladding layers. For the exemplary figures given above, the cladding may have a refractive index of 1.45 and a thickness of 10 Each of first and second branches 12, 14 has a parabolic graded index (GI) distribution spanning the waveguide width W, with a peak refractive index, $n_o$, at the axial center C of each branch. For a distance d from the axial center C of each branch, the parabolic, graded refractive index, n(d), for each branch is given by:

$$n(d) = n_o\left(1 - \frac{1}{2}\alpha^2 d^2\right), \quad (1)$$

where the peak refractive index, $n_o$ for the exemplary figures given above is 1.63, and $\alpha=24.27\times10^{-3}$ µm$^{-1}$. For the exemplary dimensions given above, the overall variable optical splitter 10 has a lateral area (in the plane of the page in the orientations of FIGS. 1A and 1B), of approximately 42,500 µm$^2$.

The input beam L has a symmetric overlapping area between the numerical apertures (NAs) of the angled branch inputs. Thus, the beam has a 50% probability to enter one of branches 12, 14. Each branch numerical aperture, NA, can be expressed as:

$$NA = n_c \sin\theta_a \cong \frac{n_0 \alpha W}{2} \quad (2)$$

where $\theta_a$ is the acceptance angle of input beam L from input optical fiber 16. The calculated acceptance angle from equation (2) is 28.41°. The angle-tilted branches 12, 14 allow for oblique incidence of each split beam $L_1$ and $L_2$ at 15° with respect to each branch central axis C. Thus, the input beam L falls within the overlapping area between the numerical apertures of the two branches 12, 14, and its power is split in two equal halves between branches 12, 14. Each split beam deflects by double the tilting angle≅2× 15°=30° (measured with respect to input axis A) after the first total internal reflection (TIR) on the branch sidewall. Then, each deflected beam propagates inside one branch and hits the other sidewall to deflect again by a second TIR at ≅−30° before it emerges from the branch output, parallel to the input beam direction (i.e., along the longitudinal direction, parallel to the y-axis in FIGS. 1A and 1B, and parallel to central axis A).

In the above, the choice of the exemplary graded index profile parameters and waveguide/branch tilt-angles was made in order to have splitting and deflection within a short distance, thus allowing for a relatively small optical splitter 30. The 15° tilting angle is found to be the maximum angle in order to achieve a short length device without having radiation loss inside cladding due to light deflections at the waveguide boundaries. The choice of a parabolic graded index, rather than a step index profile, for example, results in confined beam propagation throughout branches 12, 14 without excitation of higher-order modes, thus ensuring direct mode-matching to the single-mode output fibers without the need for spot-size converters or mode tapers.

Figure 2:
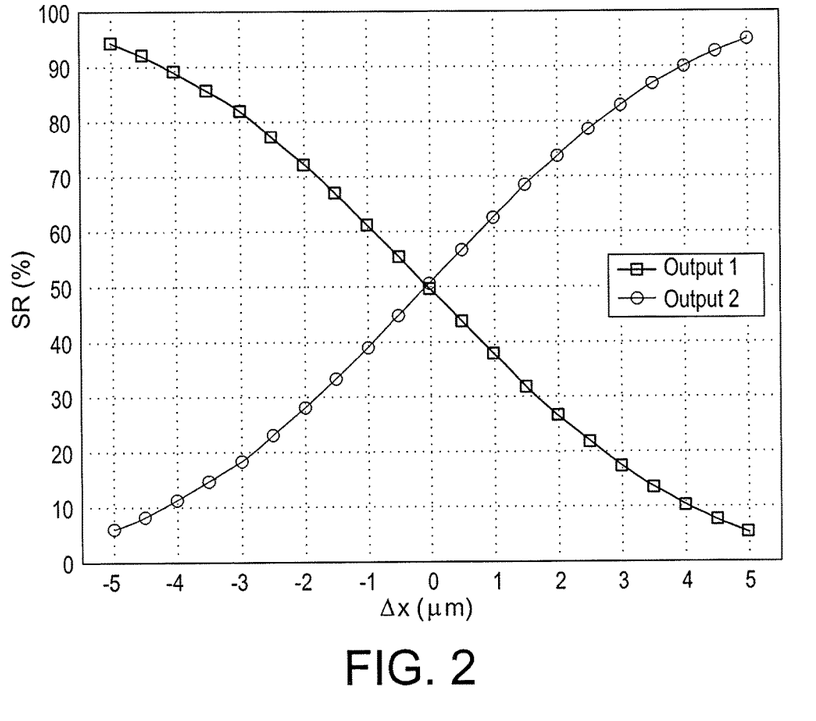
FIG. 2 is a graph showing the splitting ratio of output power for both branches of the V-shaped optical splitter of the variable optical splitter system as a function of input core lateral displacement at an operating wavelength of 1555 nm.

The power splitting ratio primarily depends on the lateral position (Δx) of the input optical fiber 16 with respect to the central, longitudinal axis A. Specifically, the power splitting ratio is dependent upon the relative position between the input core or input optical fiber 16 and the overlapping area of the numerical apertures of the output waveguides or branches 12 and 14. The more the input optical fiber 16 is displaced laterally closer to one of branches 12, 14, the more beam power is split into that branch. Thus, the splitting ratio can be simply selected during the design process by adjusting the lateral position of the input optical fiber 16 (or input core or light beam L) with respect to the central axis A, which extends through the vertex V. FIG. 2 shows the splitting ratio (SR) of the variable optical splitter for each output waveguide 12, 14 as a function of lateral displacement, Δx, of the input optical fiber 16. As shown, the change in SR is symmetric around zero displacement (i.e., aligned with axis A), and one output increases while the other decreases. In FIG. 2, Output 1 represents the output of the first branch 12 into output core or optical fiber 20. Output 2 represents the output of second branch 14 into output core or optical fiber 22. The SR increases or decreases almost linearly between SR values of 20% and 80% at a rate of ≅±10%/µm, respectively.

Figures 3A, 3C:
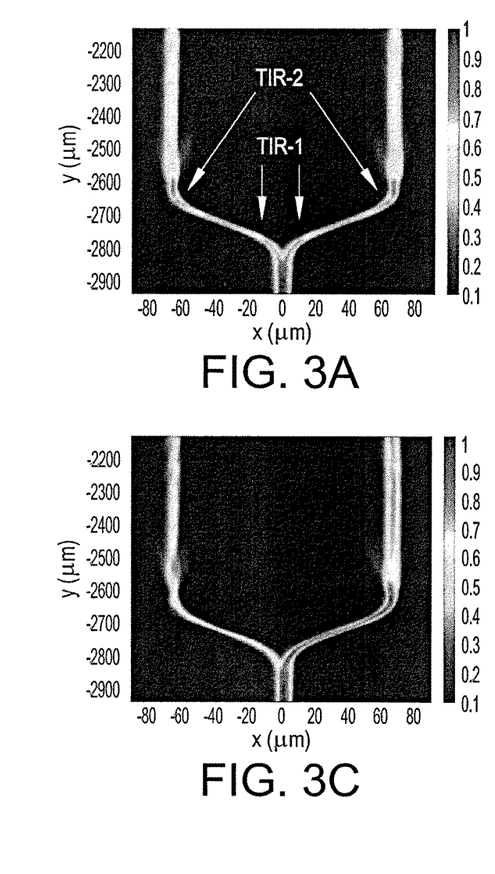
FIGS. 3A, 3B, 3C, 3D, 3E, and 3F show finite-difference time-domain method (FDTD) simulation results of power splitting of the input beam for the variable optical splitter system with a splitting ratio of 50:50, 60:40, 70:30, 80:20, 90:10, and 95:5, respectively, at a wavelength of 1555 nm.
Figures 3B, 3D:
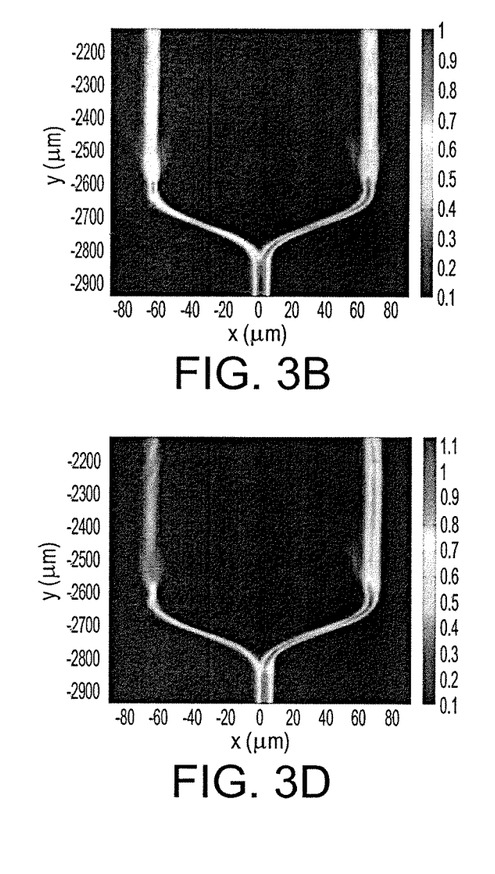
Figure 3E:
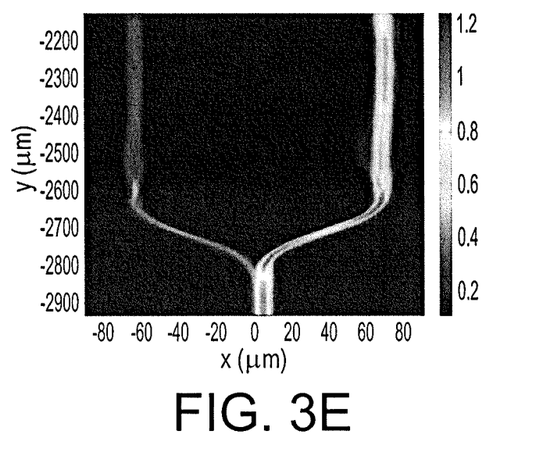
Figure 3F:
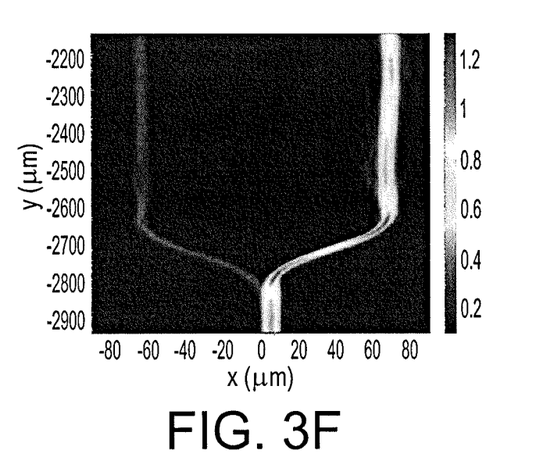

FIGS. 3A-3F show finite-difference time-domain method (FDTD) simulations of electric field magnitude (|E|) in arbitrary units (a.u.) for propagating beams inside the V-shaped optical splitter 30. FIGS. 3A-3F illustrate operation of the V-shaped optical splitter 30 at a wavelength λ of 1555 nm for splitting ratios of 50:50, 60:40, 70:30, 80:20, 90:10, and 95:5, respectively. These splitting ratios correspond to a lateral displacement of Δx=0, 0.8, 1.7, 2.7, 4.0, and 5.0 µm, respectively. The separating angle between the two split beams $L_1$, $L_2$ after the first TIR is ≅2×30°=60°. It can be seen that |E| increases at the right-side output (Output 2) and decreases at left-side output (Output 1) as the input optical fiber 16 is laterally displaced in the positive x-direction. FIGS. 3A-3F also indicate no significant sign of radiation loss within the cladding of V-shaped optical splitter 30. In FIG. 3A, the points of the first total internal reflection (TIR-1) and the second total internal reflection (TIR-2) are indicated.

Figure 4A:
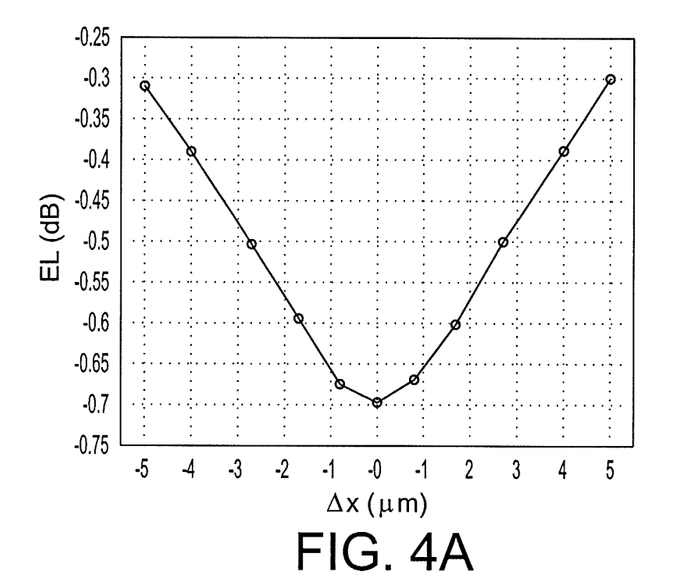
FIG. 4A is a graph of simulated test results showing excess loss (EL) for the variable optical splitter system as a function of lateral displacement of the light source with respect to the input surface of the V-shaped optical splitter at an operating wavelength of 1555 nm.
Figure 4B:
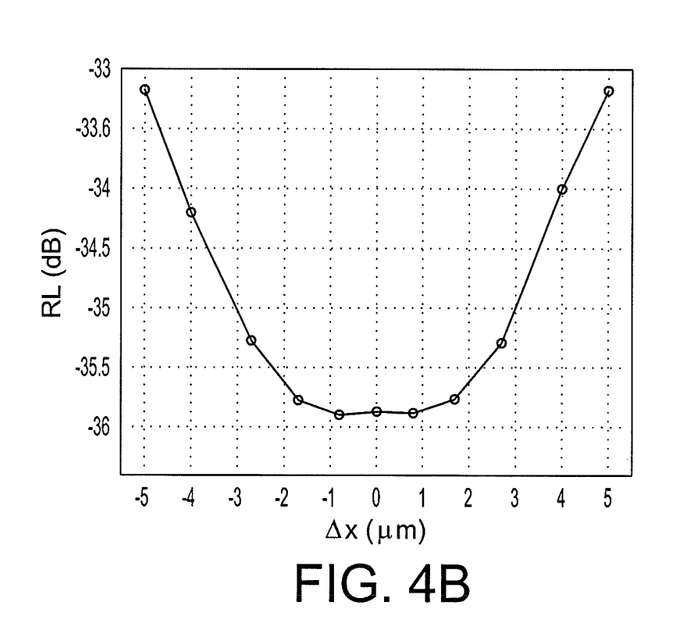
FIG. 4B is a graph of simulated test results showing return loss (RL) for the variable optical splitter system as a function of lateral displacement of the light source with respect to the input surface of the V-shaped optical splitter at an operating wavelength of 1555 nm.

To assess the performance of V-shaped optical splitter 30, FDTD simulations were also performed to evaluate its characteristic parameters, such as excess loss (EL), return loss (RL), and polarization-dependent loss (PDL). FIG. 4A shows EL as a function of input lateral displacement (Δx) at a wavelength of 1555 nm. The EL is defined as the ratio between the sum of output powers and the input power. As shown, the EL magnitude ranges from approximately 0.3 to approximately 0.7 dB. Thus, the overall EL can be considered small. The EL is symmetric around zero-value displacement and increases with positive or negative displacement as the coupling loss between outputs and the respective waveguides increases. FIG. 4B shows the overall RL as a function of input lateral displacement (Δx) at the wavelength of 1555 nm. The RL is defined as the ratio between back-reflected power at the splitter input and the input power. The RL is considered reasonable, with a worst case magnitude of approximately 33.2 dB. The RL is also symmetric around zero displacement. The RL increases with displacement, as back-reflection increases with more coupling-loss between outputs and the corresponding waveguides.

Figure 5A:
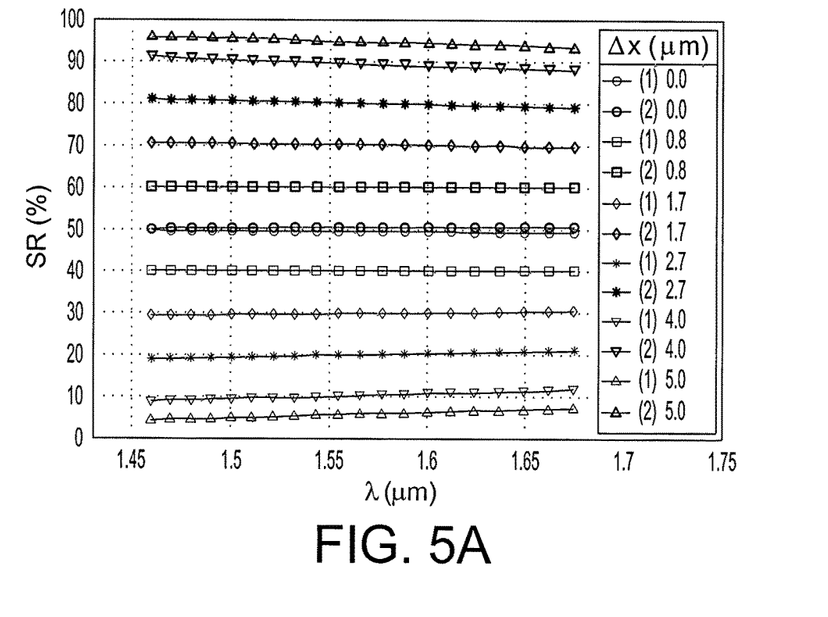
FIG. 5A is a plot showing the splitting ratio (SR) for each output of the variable optical splitter system as a function of input wavelength over a wideband wavelength range of S, C, L, and U bands.

The splitter characteristic parameters are also evaluated over the S, C, L, and U-bands, covering the wideband wavelength range from 1.46 µm to 1.675 µm. FIG. 5A shows the SR of Output 1 and Output 2 as a function of wavelength at selected displacement values of Δx=0, 0.8, 1.7, 2.7, 4.0 and 5.0 µm. These displacement values correspond to standard SR values of 50:50, 60:40, 70:30, 80:20, 90:10 and 95:5, respectively. As shown, each SR is almost constant over the wideband wavelength range. The worst case deviation in SR is approximately 1.4% at SR=90:10 and 95:5, measured at the end of the wavelength range, which is considered reasonable for such a wideband range.

Figure 5B:
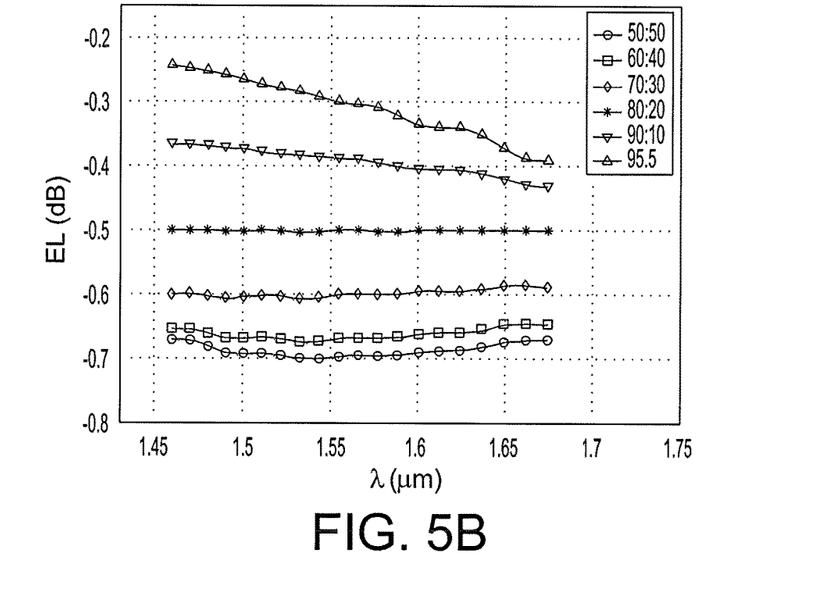
FIG. 5B is a plot showing the excess loss (EL) for the variable optical splitter system as a function of input wavelength over a wideband wavelength range of S, C, L, and U bands.

FIG. 5B shows the EL as function of wavelength. As seen, the overall EL is small over the wideband range. The worst case variation in EL over the tested wavelength range is approximately 0.15 dB at SR=95:5, which is considered small. The worst case magnitude of EL is approximately 0.7 dB at SR=50:50. The EL is primarily due to the coupling loss between the splitter and the connected optical fibers. The EL magnitude becomes maximum at SR=50:50 because both outputs contribute to the coupling loss, instead of just one output.

Figure 5C:
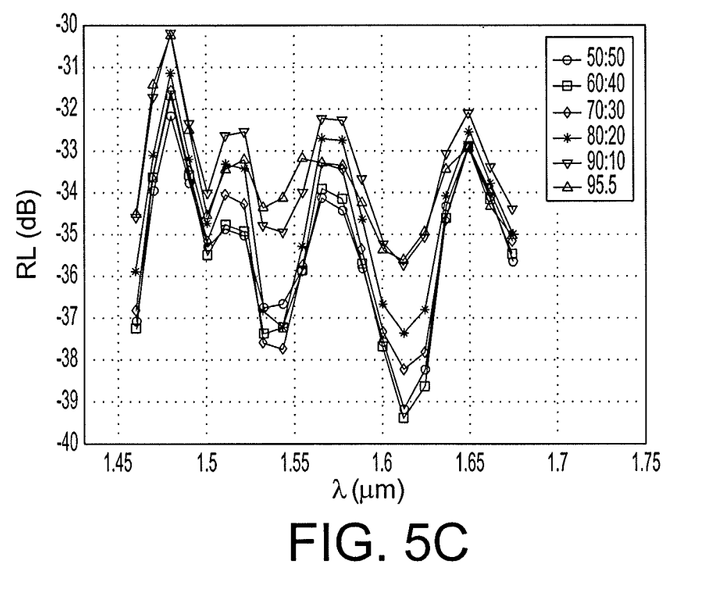
FIG. 5C is a plot showing the return loss (RL) for the variable optical splitter system as a function of input wavelength over a wideband wavelength range of S, C, L, and U bands.
Figure 5D:
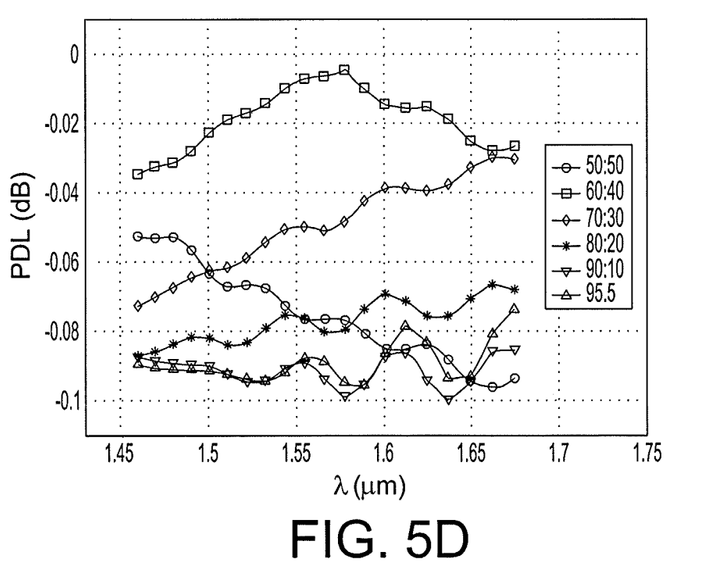
FIG. 5D is a plot showing the polarization-dependent loss (PDL) for the variable optical splitter system as a function of input wavelength over a wideband wavelength range of S, C, L, and U bands.

FIG. 5C shows the RL as a function of wavelength. As shown, the overall RL is small. The worst case magnitude of RL is approximately 30.2 dB at SR=95:5. FIG. 5D shows the PDL as a function of wavelength. The PDL is defined as the ratio between output power for TE polarization and the output power for TM polarization. As shown, the overall PDL is small. The worst case magnitude of PDL is approximately 0.1 dB at SR=90:10 and 95:5, which is considered negligible. Thus, the V-shaped optical splitter 30 can be considered polarization-insensitive.

It should be noted that unlike conventional couplers, the splitting ratio of the V-shaped optical splitter 30 can be controlled by adjusting only one parameter, i.e., the lateral position of input optical fiber 16. Thus, the splitter length and dimensions remain fixed. Further, unlike conventional couplers, the V-shaped optical splitter 30 shows wideband operation over the Short (S-band), Conventional (C-band), Long (L-band), and Ultra-long (U-band) with negligible splitting ratio variations, a small excess loss, a small polarization-dependent loss, and a reasonable return loss.

It is to be understood that the variable optical splitter system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A variable V-shaped optical splitter system, consisting of:

a V-shaped optical splitter having first and second optically transmissive branches sharing a common optically transmissive base, the first and second optically transmissive branches each defining an optical waveguide, the first and second optically transmissive branches being symmetrical about a central longitudinal axis, the first and second optically transmissive branches each having inner sides angled with respect to the central longitudinal axis and intersecting at a vertex positioned along the central longitudinal axis, the optically transmissive base having a laterally extending input surface longitudinally opposed from the vertex, each of the first and second optically transmissive branches having a laterally extending output surface parallel to and longitudinally opposed to the laterally extending input surface of the base, wherein each of the first and second optically transmissive branches is a parabolic, graded-index planar waveguide having a maximum refractive index along a central axis of the branch, whereby the light beam is split within a graded index vertex area of the optically transmissive base, the light beam being split by an overlap between respective numerical apertures of the first and second optically transmissive branches, the parabolic, graded-index planar waveguide defining each of the first and second optically transmissive branches ensuring confined beam propagation therein, providing for direct mode matching to respective output single-mode optical fibers; and a light source for directing a light beam to the laterally extending input surface, the light beam extending parallel to the central longitudinal axis and orthogonal to the laterally extending input surface, optical power from the light beam being split between the first and second optically transmissive branches in a selectively tunable power split ratio directly proportional to a distance the light beam is laterally displaced from the central longitudinal axis.

2. The variable optical splitter system as recited in claim 1, wherein each of the inner sides of the first and second optically transmissive branches defines an angle of 15° with respect to the central longitudinal axis.

3. The variable optical splitter system as recited in claim 1, wherein each of the first and second optically transmissive branches has an outer side extending parallel to the corresponding one of the inner sides.

4. The variable optical splitter system as recited in claim 1, wherein the power split ratio is directly proportional to the displacement distance for power splits between 50:50 and 90:10 throughout the Short (S), Conventional (C), Long (L), and Ultra-long (U) bands.

\* \* \* \* \*